Figure 1:
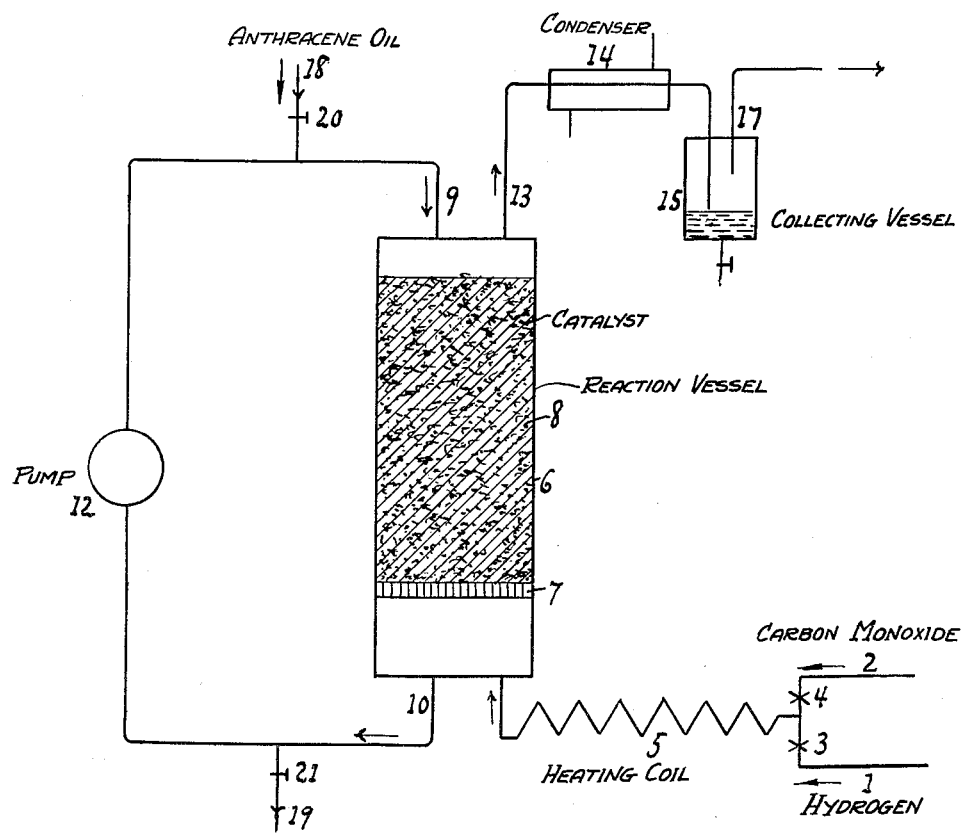

Aug. 8, 1933.   M. PIER   1,921,478
PRODUCTION OF VALUABLE LIQUID HYDROCARBONS
Filed Aug. 8, 1929   2 Sheets-Sheet 1

INVENTOR
Mathias Pier
BY his ATTORNEYS

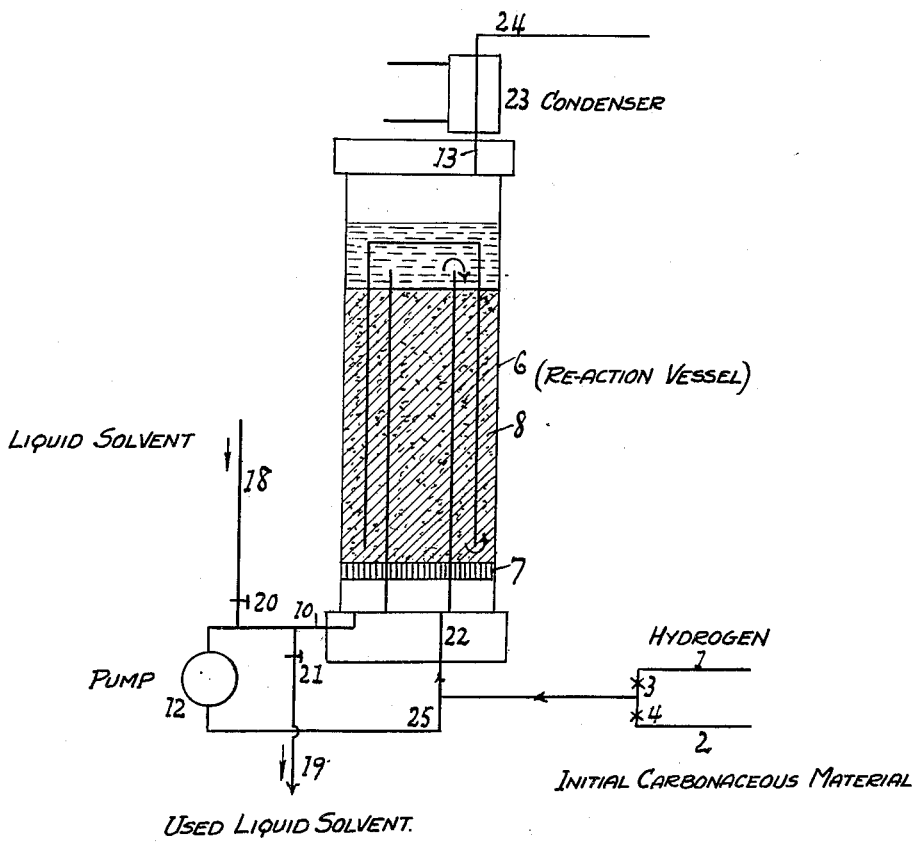

Patented Aug. 8, 1933

1,921,478

UNITED STATES PATENT OFFICE 1,921,478

PRODUCTION OF VALUABLE LIQUID HYDROCARBONS

Mathias Pier, Heidelberg, Germany, assignor, by mesne assignments, to Standard-I. G. Company, Linden, N. J., a Corporation of Delaware Application August 8, 1929, Serial No. 384,480, and in Germany September 4, 1928

4 Claims. (Cl. 196—53)

This invention relates to improvements in the manufacture and production of valuable liquid hydrocarbons, in particular those of low boiling point from fluid, namely liquid, vaporous or gaseous carbonaceous materials. The term hydrocarbons is also understood to comprise hydrocarbon derivatives, wherever it is employed in the present application.

In the treatment of liquid or gaseous carbonaceous materials such as tars, mineral oils and the like and of oxides of carbon with hydrogen or gases containing or supplying hydrogen under pressure and at elevated temperatures for the purpose of producing valuable hydrocarbons and hydrocarbon derivatives, in particular those of low boiling point, thre is frequently the disadvantage, in particular when employing catalysts, that the reaction subsides or even ceases entirely after a more or less short period of time. This phenomenon appears to be due to the fact that the initial materials form high molecular substances during the reaction and if catalysts be employed these are deposited in the pores of the catalyst and thus impair its activity.

I have now found that in many cases reactions with carbonaceous gases or liquids, which are converted into vapours under the reaction conditions, can be advantageously carried out at any suitable temperature if desired with the employment of catalysts and in particular under increased pressure by adding either before or during the reaction so much of a medium which is liquid under the reaction conditions and which does not take part in the reaction of the gaseous or vaporous substances, that the reaction occurs within this liquid medium the injurious appearance of high molecular substances being thus avoided. This manner of working has great practical importance especially in the conversion of middle oils into hydrocarbons of the nature of benzine by treatment with hydrogen under pressure in particular in the destructive hydrogenation, which, as is known, is carried out at temperatures between 300° and 700° C. and under elevated pressures above 20 atmospheres. It can also advantageously be employed for example for the production of methanol from oxides of carbon and hydrogen. It is preferable to choose a liquid medium which is a high boiling organic solvent and which is not liable to decompose under the working conditions, for example anthracene oil and the like.

It has also been found that in the treatment of the said initial materials in the liquid or gaseous phase the activity of the catalysts is preserved, if the deposition of high molecular substances on the catalyst during the reaction be prevented by the presence of high boiling organic solvents which are not likely to decompose. Suitable solvents are for example anthracene oil or similar oils, namely those of aromatic character.

The process may be carried out for example by adding the catalyst in a state of fine dispersion to the initial material for example mineral oil, or to the solvent or to both. The catalyst can also be arranged in a fixed position for example in tubes or pockets of wire gauze which may be fixed to a stirring device.

The oil to be treated can also be passed in the form of vapour together with the hydrogenating gas through the liquid solvent which contains the catalyst.

Care should preferably be taken that the liquid, that is the solvent or the mixture of the same with tar or mineral oil or the like, is vigorously stirred and that there is always a fresh supply of liquid solvent in the reaction chamber. The catalyst is advantageously employed in a state of fine dispersion.

It is advantageous to work in such a manner that the liquid in the reaction chamber is continuously removed therefrom and conducted back again into the same while avoiding cooling, and in this manner, if desired, a greater quantity of reaction gas can also be pumped in with it. The sulphur and oxygen content of the circulating liquid is thus very small since these elements are carried away in the form of volatile compounds by the effluent gases. A hot gas cycle may also be employed. The quantity of products leaving with the unused hydrogenating gases can be readily regulated by the quantity of gas introduced and thus it is possible to leave the initial materials which are to be treated in the reaction chamber for a very long period of time, and only to remove the products which have been sufficiently treated. This manner of working allows of leaving the participants in the reaction in the reaction chamber for a very long period of time, because any high molecular products formed which would render the catalyst inactive are not precipitated thereon. In addition to the advantage that the products are obtained in a high degree of purity and that the necessity of expensive distillation of the product or return of a portion thereof to the reaction chamber is thus obviated, there is also the advantage that by working according to the present invention a favourable distribution of heat and a great economy in energy are attained. The hydrogen, or gases containing or supplying the same, are suitably introduced into the reaction chamber in a state of fine dispersion, for example through fine nozzles or through solid porous masses.

In order to prevent too strong a concentration of the undesirable high molecular substances in the solvent, the latter can be renewed continuously or at intervals, for example by removing the liquid from the reaction chamber through a filter so that the catalyst remains in the reaction chamber, separating the undesirable substances from the solvent and recycling the solvent into the reaction chamber or by partially or wholly removing the liquid mass from the reaction chamber, separating the catalyst from the liquid and returning the former to the reaction chamber, if desired after a regeneration which can be carried out with or without the employment of pressure for example by grinding in a high speed mill.

The hydrocarbons of low boiling point formed in the reaction chamber, in particular the benzines and also middle oils and the like are drawn off from the reaction chamber in the form of vapour. It is preferable to insert a reflux condenser in the conduit by which the low boiling products leave the reaction chamber in order to return to the reaction chamber any products, which boil at a higher temperature than the desired products. By the process in accordance with the present invention, by which also the material of which the apparatus is constructed is protected, it is possible to convert tars and mineral oils to a great extent into benzines.

In contrast to working in the vaporous phase in the absence of the liquid medium employed according to the present process, for example in the production of benzine from middle oil, there is the advantage that the hydrogen content of the product to be obtained can be varied to a great extent. The reacting materials together with the liquid medium can be removed from and returned to the reaction chamber without appreciable cooling and in this manner very valuable, comparatively pure benzine can be obtained with much less hydrogen. There is also the advantage that the reaction chamber can be much simpler in construction, and that fewer heat exchangers, which on account of the necessary repairs are themselves expensive and which are costly in operation, are necessary and that thus losses of energy are reduced.

The catalysts preferably employed according to the present invention are those immune from poisoning by sulphur, and in particular such comprising metals from the 6th group of the periodic system in a free or combined state, as for example, molybdenum, tungsten, chromium or uranium. Pressures of 5, 10, 20 or more atmospheres, for example 50, 100 or preferably of 150, 200, 300, 500, 1000, 3000, 5000 or even more atmospheres come into question in the process according to the present invention. As examples of elevated temperatures may be mentioned such of between about 300° and 700° C. but preferably of between about 360° and 500° C. Temperatures ranging between about 390° and 450° C. are particularly suitable.

The following examples and the accompanying drawings will further illustrate how the said invention may be carried out in practice but the invention is not restricted to these examples nor to the specific apparatus shown in the drawings.

Figure 1 has reference to Example 1, Figure 2 to Example 3.

Example 1

Figure 1 of the drawings show diagrammatically a vertical section of an apparatus for the production of higher alcohols from carbon monoxide and hydrogen.

1 and 2 are pipes for introducing the initial gases, 3 and 4 are valves, 5 is a heating coil for preheating the initial gas mixture, 6 is a reaction vessel fitted with a perforated plate 7, which supports a catalyst 8. 9 and 10 are pipes, which lead from a pump 12 to the reaction vessel 6. 13 is a pipe for drawing off the products obtained, 14 is a condenser, 15 a collecting vessel, 16 a cock for drawing off the condensed liquor and 17 a pipe for discharging the uncondensed gases and vapors. 18 is a pipe for supplying fresh material which is liquid under the conditions of working and which does not take part in the reaction, and 19 is a pipe for taking off used liquid solvent. The rate of flow in pipes 18 and 19 is controlled by cocks 20 and 21 respectively.

Hydrogen and carbon monoxide are passed through the pipes 1 and 2, the rate of flow of these gases being controlled by the valves 3 and 4 so as to produce a mixture of 70 per cent of hydrogen and 30 per cent of carbon monoxide. The said gases are heated in the coil 5 to a temperature of between 390° and 400° C. and are passed over the catalyst 8 which is continuously rinsed by an oil, for example, anthracene oil, forced by pump 12 through pipe 9 into the reaction vessel. 7 cubic meters of gas mixture and 1 kilogram of anthracene oil are supplied per hour per each kilogram of catalyst. This oil takes off high molecular compounds possibly formed, which drop down to the bottom of the vessel and are drawn off by pump 12 through pipe 10.

Fresh liquid solvent may be continuously supplied by the pipe 18 and used liquid solvent may be drawn off through the pipe 19. The aforesaid catalyst 8 is prepared by fusing together zinc oxide and calcium bichromate. The reaction products pass by pipe 13 into the condenser 14 where they are condensed. They are collected into the collecting vessel 15 and may be drawn off at the cock 16. The uncondensed parts of the reaction products are discharged through pipe 17. A mixture of higher alcohols is thus obtained. The high molecular compounds produced are kept in solution by the rinsing oil and thus cannot be precipitated on the catalyst. The latter therefore retains its activity almost continuously. When the concentration of the high molecular compounds in the circulating rinsing oil becomes high, the oil is preferably renewed.

Example 2

By converting a heavy tar from the low temperature carbonization of brown coal in the liquid phase by employing hydrogen at about 450° centigrade and at 200 atmospheres and in the presence of a catalyst prepared from a mixture of molybdic acid, chromic acid and manganese carbonate, which is rigidly arranged in the reaction vessel, in consequence of the distilling off of the light splitting products formed, an increase in the concentration of heavier tar constituents occurs, and these are gradually precipitated on the catalyst and reduce its activity. By introducing anthracene oil into the reaction vessel, and in such quantity that at least half of the entire liquid in the reaction vessel is anthracene oil, (for example 0.5 kilogram of anthracene oil together with 0.5 kilogram of the said heavy tar per hour per each kilogram of catalyst) and by passing the said liquid in a cycle, the heavy constituents of the oil subjected to splitting are kept in solution, and the catalyst retains its activity practically continuously.

*Example 3*

Figure 2 of the drawings shows diagrammatically a vertical section of an apparatus wherein the conversion of the carbonaceous matter may be carried out in the presence of so much of a liquid medium not taking part in the reaction that the reaction occurs in the liquid phase.

1 and 2 are pipes for introducing hydrogen and a carbonaceous material respectively, 3 and 4 are valves, 22 is a pipe for introducing the initial materials provided with an addition of the said liquid medium into the reaction vessel 6 which is fitted with a perforated plate 7 which supports a catalyst 8; 10 is a pipe leading from the reaction vessel to the pump 12, 13 is a pipe leading from the reaction vessel 6 to the reflux condenser 23, and 24 is a pipe for drawing off the reaction products. 18 is a pipe for supplying fresh liquid solvent and 19 is a pipe for withdrawing used liquid solvent. The rate of flow in the pipes 18 and 19 is controlled by cocks 20 and 21 respectively.

Hydrogen and gas oil are introduced through pipes 1 and 2, the rate of flow being controlled by the valves 3 and 4. At 25 the said initial materials are joined with a flow of a heavy oil free from asphaltum, obtained by the destructive hydrogenation of pit coal, and of which the greater portions boil above 325° C. and are introduced by pipe 22 into the reaction vessel 6 which is filled with the catalyst 8, which contains chromium and molybdenum and which rests on the perforated plate 7. Heavy oil is continuously pumped through the reaction vessel by means of the pump 12, being introduced by pipe 22 and removed from the reaction vessel by the pipe 10. Fresh heavy oil may be continuously supplied by the pipe 18 and used heavy oil may be drawn off through the pipe 19. 1.5 kilograms of the said heavy oil and 3000 liters of hydrogen are supplied per hour per each kilogram of catalyst. A temperature of about 450° C. and a pressure of about 200 atmospheres is maintained in the reaction vessel. The gas oil vaporizes under the conditions of working. The mixture of gas oil and hydrogen is pumped vigorously into the vessel, so that a brisk movement of the oils contained therein occurs. Although by this manner of working the bulk of the heavy oil remains unchanged, the gas oil is completely converted into products boiling below 200° C. These are carried away from the reaction vessel through pipe 13 by the effluent stream of hydrogen. The higher boiling fraction is returned to the reaction vessel by the reflux condenser 23 of the nature of a column, and may be pumped in a cycle together with the heavy oil and treated again so that besides benzine and hydrogen no appreciable amounts of other products leave the reaction vessel.

What I claim is:

1. In a process of destructively hydrogenating fluid hydrocarbons in the presence of a catalyst immune to sulphur poisoning at a temperature of 300 to 700° C., a pressure of at least 20 atmospheres with hydrogen, which hydrocarbons under the conditions of the reaction form high molecular weight substances injurious to the catalyst, said hydrocarbons being initially free from large quantities of said injurious substances, the step of preventing deposition of said injurious substances on the catalyst by effecting the catalytic reaction in the presence of sufficient amounts of a high boiling solvent of aromatic character to continually dissolve said injurious substances and retain said substances in solution.

2. The process as defined in claim 1 wherein the high boiling solvent of aromatic character is anthracene oil and the anthracene oil is removed from the reaction space, separated from said injurious substances and returned to the reaction space.

3. The process as defined in claim 1 wherein the destructive hydrogenation is effected at a temperature ranging from 360 to 500° C. under a pressure of more than 50 atmospheres in the presence of a catalyst comprising a metal from the sixth group of the periodic system and wherein a high boiling solvent of aromatic character is passed in a cycle.

4. The process as defined in claim 1 wherein a heavy tar obtained by the low temperature carbonization of brown coal is destructively hydrogenated in the liquid phase at a temperature of about 350° C., under a pressure of 200 atmospheres in the presence of a catalyst prepared from a mixture of molybdic acid, chromic acid and a basic manganese compound and wherein the high boiling solvent of aromatic character is anthracene oil which oil is used in a quantity equal to at least one-half of the quantity of liquid in the reaction vessel and which oil is passed in a cycle.

MATHIAS PIER.